No. 800,802. PATENTED OCT. 3, 1905.
G. E. FRANQUIST.
SHAFT COUPLING.
APPLICATION FILED JUNE 24, 1905.
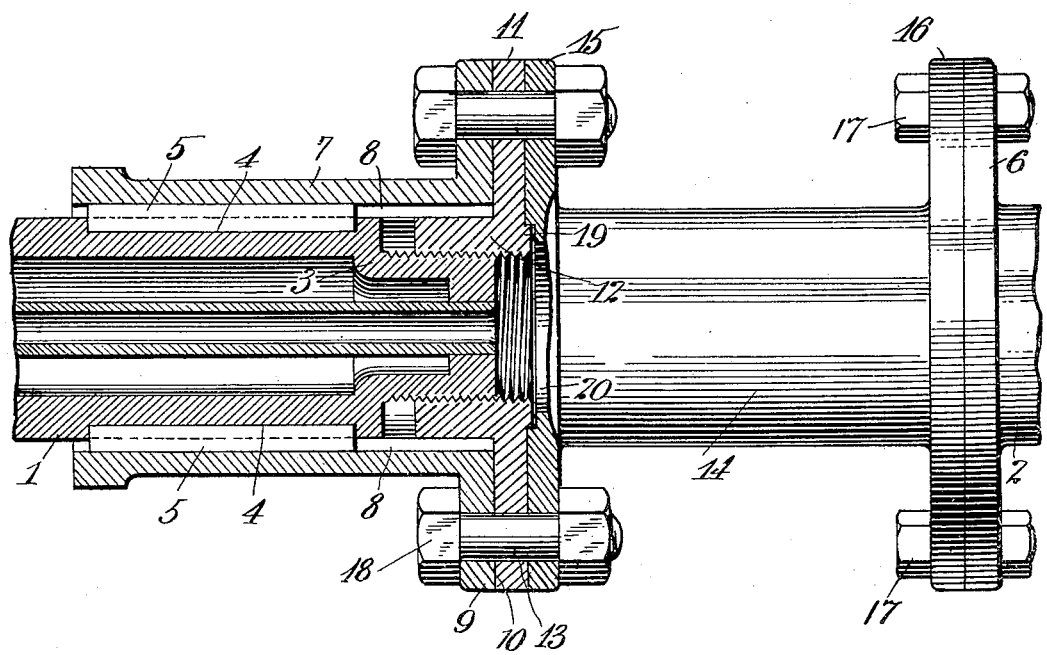
Witnesses  
Inventor  
Gustav E. Franquist  
By his Attorneys  
Rosenbaum & Stockbridge

UNITED STATES PATENT OFFICE.

GUSTAVE EWARD FRANQUIST, OF NEW YORK, N. Y.

SHAFT-COUPLING.

No. 800,802.  Specification of Letters Patent.  Patented Oct. 3, 1905.

Application filed June 24, 1905. Serial No. 266,749.

*To all whom it may concern:*

Be it known that I, GUSTAVE EWARD FRANQUIST, a citizen of the United States, residing at the city of New York, in the borough of Manhattan and State of New York, have invented certain new and useful Improvements in Shaft-Couplings, of which the following is a full, clear, and exact description.

My invention relates to an apparatus for coupling together different sections of line-shafts, counter-shafts, and mechanically-rotating parts of various kinds, particularly in engines, motor-vehicles, and organized machines where the different rotating parts are fixedly incorporated into their respective positions. In this class of machines the parts are assembled and built up upon the main frame or casting, and when the structure approaches completion and it becomes necessary to interconnect the different or alined shafts and other rotatable parts it may happen, in view of their fixed relation with respect to the main frame or casting, that they do not lie with respect to one another exactly as planned and means must be adopted to bring the parts into coupling relation.

It is the purpose of my invention to devise means by which the various mechanisms of the complete machine can be independently assembled in their position upon the main frame and finally their rotatable parts interconnected by a means which does not require to be specially designed and machined into fitting relation at the last moment, but comprises stock-fixtures of interchangeable applicability which are designed to compensate for irregular relations. By this means the entire machine may be laid out on the drafting-board in the first instance and all of the parts interchangeably made.

A further object of my invention is to provide a device of this character which shall be neat and attractive in appearance, simple and easy to construct, and efficient in operation.

With these and other objects in view my invention consists in the construction, combination, location, and arrangement of parts, all as will be more fully hereinafter set forth, as shown in the accompanying drawing, and finally pointed out in the appended claims.

In the drawing I have illustrated in a view, partly in section and partly in side elevation, a form of compensating shaft-coupling embodying the principles of my invention.

1 and 2 designate the respective rotating connections, which may be any two alined shafts or rotating parts organized into the different mechanisms which constitute parts of a complete machine. I form one of these shafts or parts with a threaded stud 3 at its end or extremity, and upon the periphery of the shaft or part and at a point near the end thereof I form recesses 4, formed to secure keys 5, or in any other way machine the shaft or part so as to give it a non-cylindrical section. 6 denotes a flange at the extremity of the shaft 2, which terminates at an irregular interval from the end of the alined shaft 1. These features thus far described constitute the parts which are required to be coupled to rotate together, and I will now describe the elements of the compensating shaft-coupling which I have employed in practice to accomplish this result.

7 denotes a sleeve formed with keyways 8 upon the interior surface of a size to engage the keys 5 on the shaft 1 with a smooth sliding fit.

9 denotes a flange upon the sleeve 7, having a series of bolt-holes 10 extending through the face thereof.

11 indicates a flanged collar having an internally-threaded section 12 adapted to screw upon the threaded stud 3, before described. The flange 11 is provided with holes 13 of a number and form adapted to be alined with the holes 10, previously mentioned.

14 denotes a coupling member which is in the form of a short shaft-coupling having flanges 15 and 16 thereon. The flange 16 is secured in any suitable way—as, for example, by bolts 17—to the flange 6, and flange 15 has holes therein adapted to be alined with the holes 10 and 13, before mentioned.

The feature of my device which renders it a practicable shaft-coupling lies in the relation of the flanged collar 11 and the coupling member 14. Upon the flanged collar 11 I form a small projecting boss 19, which can be conveniently turned in a lathe exactly concentric with the threaded section 12. Within the end of the coupling member 14 is a corresponding recess 20, which can also be conveniently turned exactly concentric with the member 14. The boss 19 and the recess 20 engage one another with an easy driving fit in the usual manner of shaft-couplings, and by this means the shaft 1 and the section 14 are held in alinement with one another. In like manner the sections 6 and 14 are held in absolute alinement, this being merely a usual shaft-coupling whereby shafts 1 and 2 are constrained and held in absolute alinement with one another.

The operation, which in this case is the organization of the parts, is as follows: The machine may be imagined in the condition of having the shafts or parts 1 and 2 organized into place and in correct alinement with one another, but at an unmeasured distance apart. It is desired to apply the coupling composed of stock-fixtures to firmly and neatly connect the two shafts or parts without doing any machine-work or any other fitting or measuring operation. A flanged sleeve 7 is taken from stock and slid over the shaft 1, so that the keyway 8 engages the key 5 and holds the parts in non-rotatable but slidable relation. Stock-fixture 11 is next applied to the end of the shaft 1 and screwed around on the threaded stud 3 until it almost arrives at its limit of movement. A coupling-section 14 can now be conveniently inserted between the flange 6 and the flange 11, which are far enough apart for this purpose, and bolts applied to secure flanges 6 and 16 firmly together. The flanged collar 11 is now reversely rotated on the stud 3, by which means it is screwed outward on the stud into firm engagement with flange 15, and the parts are manipulated until all the corresponding holes in the parts 9, 11, and 15 are in alinement with one another, after which bolts 17 are inserted in the holes and everything clamped into rigid relation.

What I claim is—

1. In a compensating shaft-coupling, a shaft, a flanged sleeve slidably disposed on said shaft, a second shaft having a coupling member thereon, means for connecting said flanged sleeve and coupling member, and means for adjusting said flanged sleeve to any desired position upon its shaft.

2. A compensating shaft-coupling having a shaft, a flanged sleeve slidably but non-rotatably disposed on said shaft, a second shaft having a flanged coupling member thereon, means for connecting said flanged sleeve to said coupling member, and means for adjusting said flanged sleeve to any desired position upon its shaft.

3. In a compensating coupling, a shaft having a threaded stud at the extremity thereof, a sleeve slidably but non-rotatably disposed on said shaft, a flanged collar threaded to engage said threaded stud, and a second shaft adapted to be operatively connected to said sleeve and collar.

4. In a compensating shaft-coupling, a shaft having a threaded stud at the extremity thereof, a flanged sleeve slidably but non-rotatably disposed on said shaft, a flanged collar having a boss and threaded to engage said stud, and a coupling member having a recess to engage said boss.

5. In a compensating shaft-coupling, a shaft having a threaded stud thereon, a sleeve slidably but non-rotatably disposed upon said shaft, a flanged collar threaded to engage said stud, a coupling member, means for connecting said sleeve, collar and coupling member.

6. In a compensating shaft-coupling, a shaft having a threaded stud thereon, a sleeve slidably but non-rotatably disposed on said shaft, a collar threaded to engage said stud, a coupling member, and means for connecting said sleeve, collar and coupling member.

7. In a compensating shaft-coupling, a shaft having a threaded stud thereon, a sleeve slidably but non-rotatably disposed on said shaft, a collar threaded to engage said stud and having a boss, and a coupling member having a recess to engage said boss and adapted to be connected to said sleeve and collar.

8. In a compensating shaft-coupling, a shaft having a threaded stud thereon, a sleeve slidably but non-rotatably disposed on said shaft, and having flanges with holes or openings therein, a flanged collar threaded to engage said threaded stud and having a boss or projection thereon, and holes to correspond with the holes in said flanged sleeve, a second shaft alined with the first, and a coupling member coupled to said shaft and having a flange with holes to correspond with said holes in said flanged sleeve and collar, and having a recess to engage said boss, and bolts located in said holes or openings in the sleeve collar and member, and adapted to connect said parts.

In witness whereof I subscribe my signature in the presence of two witnesses.

GUSTAVE EWARD FRANQUIST.

Witnesses:
FRANK S. OBER,
WALDO M. CHAPIN.